US010604037B2

(12) United States Patent
Mahadik et al.

(10) Patent No.: US 10,604,037 B2
(45) Date of Patent: Mar. 31, 2020

(54) FOLD AND TUMBLE MECHANISM FOR A VEHICLE SEAT

(71) Applicant: LEAR CORPORATION, Southfield, MI (US)

(72) Inventors: Mangesh Mahadik, Pune (IN); Nilesh Mahajan, Pune (IN); Rajiv Kumar, Pune (IN); Sharad Surwase, Solapur (IN); Michael Ferrari, St. Clair Shores, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/042,035

(22) Filed: Jul. 23, 2018

(65) Prior Publication Data

US 2018/0326878 A1 Nov. 15, 2018

Related U.S. Application Data

(62) Division of application No. 15/212,723, filed on Jul. 18, 2016, now Pat. No. 10,052,983.

(51) Int. Cl.
*B60N 2/30* (2006.01)
*B60N 2/20* (2006.01)
(Continued)

(52) U.S. Cl.
CPC .............. *B60N 2/305* (2013.01); *B60N 2/10* (2013.01); *B60N 2/20* (2013.01); *B60N 2/2236* (2013.01); *B60N 2/30* (2013.01); *B60N 2/3011* (2013.01)

(58) Field of Classification Search
CPC ........ B60N 2/305; B60N 2/20; B60N 2/2236; B60N 2/3011; B60N 2/30; B60N 2/10
See application file for complete search history.

(56) References Cited

U.S. PATENT DOCUMENTS

| 6,139,104 A | 10/2000 | Brewer |
| 6,698,837 B2 | 3/2004 | Pejathaya et al. |

(Continued)

FOREIGN PATENT DOCUMENTS

| DE | 102013221929 A1 | 3/2015 |
| DE | 102013221931 A1 | 3/2015 |

(Continued)

OTHER PUBLICATIONS

Indian Examination Report dated Nov. 20, 2019, Application No. 201744015305, Applicant LEAR Corporation, 6 pages.

*Primary Examiner* — Philip F Gabler
(74) *Attorney, Agent, or Firm* — Brooks Kushman P.C.

(57) ABSTRACT

A vehicle seat includes a seat bottom, a seat back and a floor latch associated with the seat bottom. The seat further includes a recliner arrangement including a recliner bracket connected to the seat bottom, a back side bracket connected to the seat back, and a recliner connected to the recliner bracket and the back side bracket and configured to allow the seat back to pivot with respect to the seat bottom. In addition, the seat includes a fold and tumble mechanism having an actuating member pivotally connected directly to the back side bracket, and a rocker member pivotally connected to the recliner bracket and connected to a latch cable associated with the floor latch. The actuating member is engageable with the rocker member when the seat back is pivoted forwardly to cause the rocker member to pivot and pull on the latch cable, which releases the floor latch so that the seat bottom may pivot upwardly.

20 Claims, 6 Drawing Sheets

(51) Int. Cl.
*B60N 2/22* (2006.01)
*B60N 2/10* (2006.01)

(56) References Cited

U.S. PATENT DOCUMENTS

| | | |
|---|---|---|
| 7,156,643 B2 | 1/2007 | Parrinello |
| 7,201,425 B2 | 4/2007 | Tsujibayashi et al. |
| 7,393,056 B2 | 7/2008 | O'Connor |
| 7,494,186 B2 | 2/2009 | Paing et al. |
| 8,096,618 B2 | 1/2012 | Bruck et al. |
| 8,251,450 B2 | 8/2012 | Carroll et al. |
| 8,408,648 B2 | 4/2013 | Champ |
| 8,430,454 B2 | 4/2013 | Tanguy et al. |
| 8,449,034 B2 | 5/2013 | Tame et al. |
| 8,544,931 B2 | 10/2013 | Park et al. |
| 8,544,956 B2 | 10/2013 | Park et al. |
| 8,690,251 B2 | 4/2014 | Miller et al. |
| 8,720,996 B2 | 5/2014 | Nazione et al. |
| 8,840,187 B2 | 9/2014 | Seibold et al. |
| 8,864,209 B2 | 10/2014 | White et al. |
| 8,960,800 B2 | 2/2015 | Champ et al. |
| 10,052,983 B2 * | 8/2018 | Mahadik .................. B60N 2/20 |
| 2004/0166193 A1 | 8/2004 | Parrinello et al. |
| 2005/0158421 A1 | 7/2005 | Zoppas |
| 2015/0123443 A1 | 5/2015 | Abraham et al. |

FOREIGN PATENT DOCUMENTS

| | | |
|---|---|---|
| DE | 102014212598 A1 | 12/2015 |
| KR | 100510374 B1 | 8/2005 |

\* cited by examiner

FOLD AND TUMBLE MECHANISM FOR A VEHICLE SEAT

CROSS-REFERENCE TO RELATED APPLICATIONS

This application is a division of U.S. application Ser. No. 15/212,723 filed Jul. 18, 2016, the disclosure of which is hereby incorporated in its entirety by reference herein.

TECHNICAL FIELD

The disclosure relates to a fold and tumble mechanism for a vehicle seat.

BACKGROUND

Prior vehicle seat designs are disclosed in U.S. Pat. Nos. 7,494,186 and 8,544,956.

SUMMARY

A vehicle seat according to one aspect of the disclosure includes a seat bottom, a seat back that is pivotable with respect to the seat bottom, and a floor latch associated with the seat bottom. The seat further includes a recliner arrangement including a recliner bracket connected to the seat bottom, a back side bracket connected to the seat back, and a recliner connected to the recliner bracket and the back side bracket and configured to allow the seat back to pivot with respect to the seat bottom. In addition, the seat includes a fold and tumble mechanism having a support bracket fixedly connected to the back side bracket, an actuating member pivotally connected to the support bracket, and a rocker member pivotally connected to the recliner bracket and connected to a latch cable associated with the floor latch. The actuating member is engageable with the rocker member when the seat back is pivoted forwardly to cause the rocker member to pivot and pull on the latch cable, which releases the floor latch so that the seat bottom may pivot upwardly.

A vehicle seat according to another aspect of the disclosure includes a seat bottom, a seat back that is pivotable with respect to the seat bottom, and a floor latch associated with the seat bottom. The seat further includes a recliner arrangement including a recliner bracket connected to the seat bottom, a back side bracket connected to the seat back, and a recliner connected to the recliner bracket and the back side bracket and configured to allow the seat back to pivot with respect to the seat bottom. In addition, the seat includes a fold and tumble mechanism having an actuating member pivotally connected directly to the back side bracket, and a rocker member pivotally connected to the recliner bracket and connected to a latch cable associated with the floor latch. The actuating member is engageable with the rocker member when the seat back is pivoted forwardly to cause the rocker member to pivot and pull on the latch cable, which releases the floor latch so that the seat bottom may pivot upwardly.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
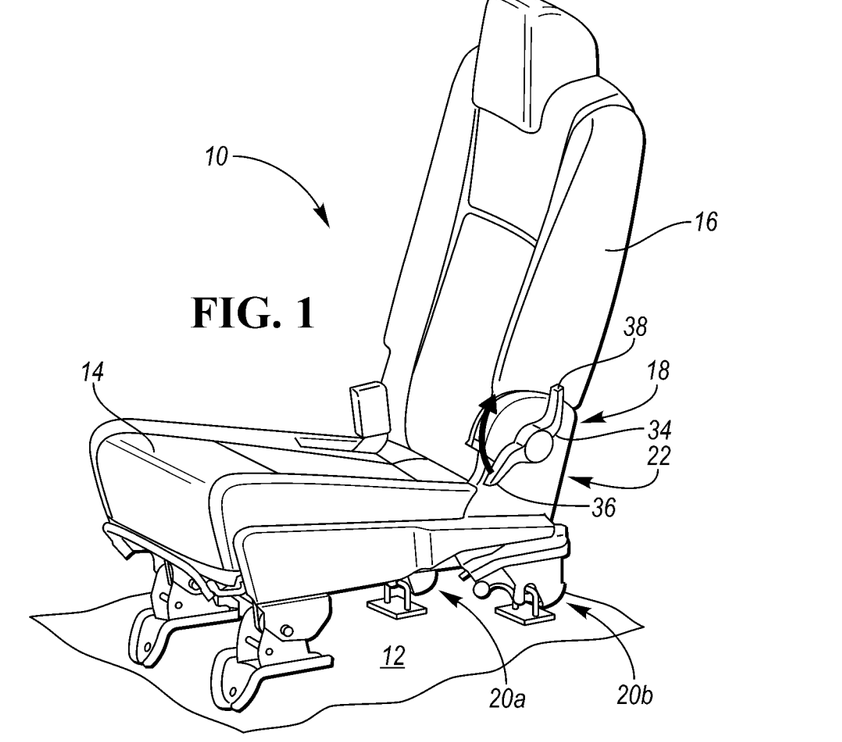
FIG. 1 is a perspective view of a vehicle seat according to the disclosure in a design use position, wherein the seat includes a seat bottom and a seat back pivotally attached to the seat bottom.

FIG. 1 shows a vehicle seat 10 according to the disclosure mounted on a floor 12 of a motor vehicle and positioned in a use position. The seat 10 includes a seat bottom 14, a seat back 16 that is pivotable with respect to the seat bottom 14, and a recliner arrangement 18 associated with the seat bottom 14 and seat back 16 and configured to allow the seat back 16 to pivot with respect to the seat bottom 14. In addition, the seat 10 includes one or more floor latches 20 (e.g., inboard and outboard floor latches 20a and 20b, respectively) associated with the seat bottom 14 for locking the seat bottom 14 to the floor 12 (e.g., to striker bars attached to or provided as part of the floor 12), and a fold and tumble mechanism 22 configured to allow the seat 10 to perform a fold and tumble operation, as explained below in detail, so that the seat 10 may move to a folded and tumbled position shown in FIG. 2.

Figure 3:
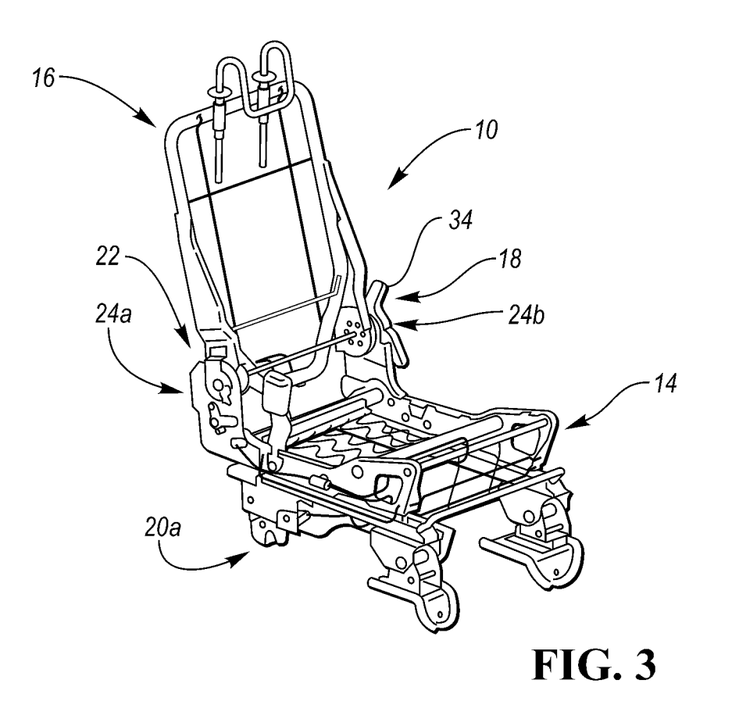
FIG. 3 is a perspective view of the seat with trim and padding removed to show a fold and tumble mechanism according to the disclosure mounted on an inboard side of the seat.
Figure 4:
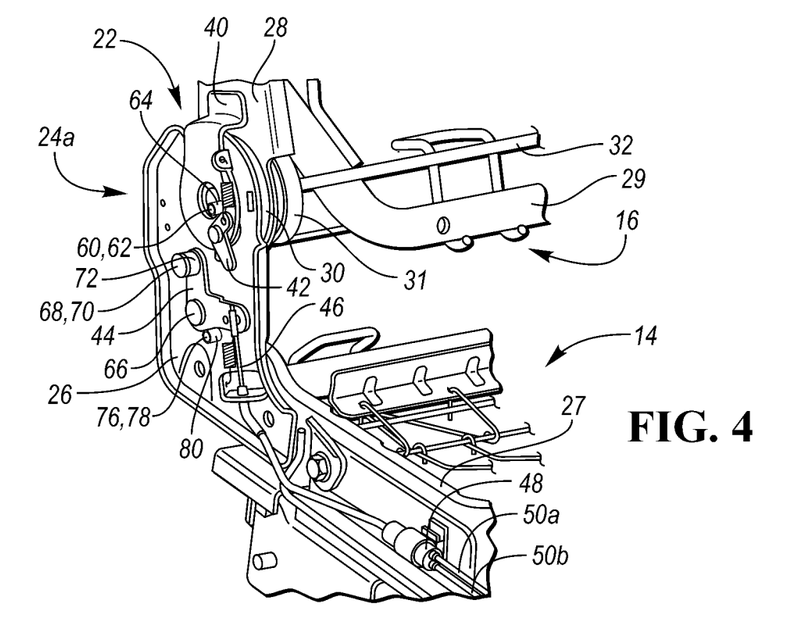
FIG. 4 is an enlarged fragmentary perspective view showing details of the fold and tumble mechanism.
Figure 5:
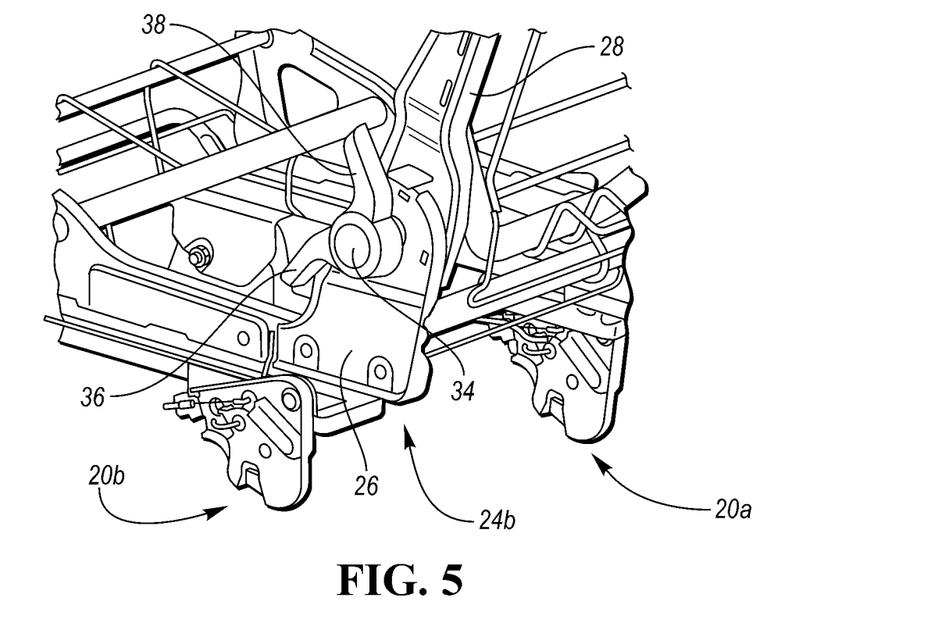
FIG. 5 is an enlarged fragmentary perspective view of an outboard side of the seat showing a recliner lever that is usable to release a recliner arrangement to allow the seat back to fold forwardly with respect to the seat bottom.

Referring to FIGS. 3-5, the recliner arrangement 18 may include first and second recliner assemblies 24a and 24b located on inboard and outboard sides, respectively, of the seat 10. The inboard side of the seat 10 is the side located closest to a center of the vehicle, and the outboard side of the seat 10 is the side located furthest away from the center of the vehicle. Each recliner assembly 24a, 24b may include a lower support member or bracket, such as a recliner bracket 26, connected to the seat bottom 14 (e.g., to a seat bottom frame 27), an upper support member or bracket, such as a back side member or bracket 28, connected to the seat back 16 (e.g., to a seat back frame 29), and a recliner 30 connected to the recliner bracket 26 and the back side bracket 28 and configured to allow the seat back 16 to pivot with respect to the seat bottom 14. Alternatively, the recliner bracket 26 may be considered part of the seat bottom 14, and the back side bracket 28 may be considered part of the seat back 16. Referring to FIG. 4, the recliner 30 may be disposed between the recliner bracket 26 and the back side bracket 28. Furthermore, the recliner 30 may be any suitable recliner such as a sector gear or a disk recliner that includes one or more slidable pawls having teeth that are engageable with internal teeth formed on a rotatable disk.

The recliner arrangement 18 may also include a biasing member, such as a spring 31, for urging the seat back 16 forwardly toward the seat bottom 14. As shown in FIG. 4, the spring 31 may be positioned on an inner side of the back side bracket 28, such that the back side bracket 28 is disposed between the recliner 30 and the spring 31.

In the embodiment shown in FIGS. 3-5, the recliner arrangement 18 further includes a shaft 32 (e.g., spline shaft) that extends between the first and second recliner assemblies 24a and 24b, and a recliner lever 34 connected to the second recliner assembly 24b and the shaft 32 for actuating both recliners 30 of the recliner assemblies 24a, 24b. The recliner lever 34 may include a lower handle 36, which may be grasped by an occupant of the seat 10 for reclining the seat back 16 or by someone desiring to execute a fold and tumble operation in order to gain access behind the seat 10 (e.g., access to a third row seat), and an upper handle 38 that may be grasped by a vehicle occupant located behind the seat 10 in order to perform a fold and tumble operation.

Figure 6:
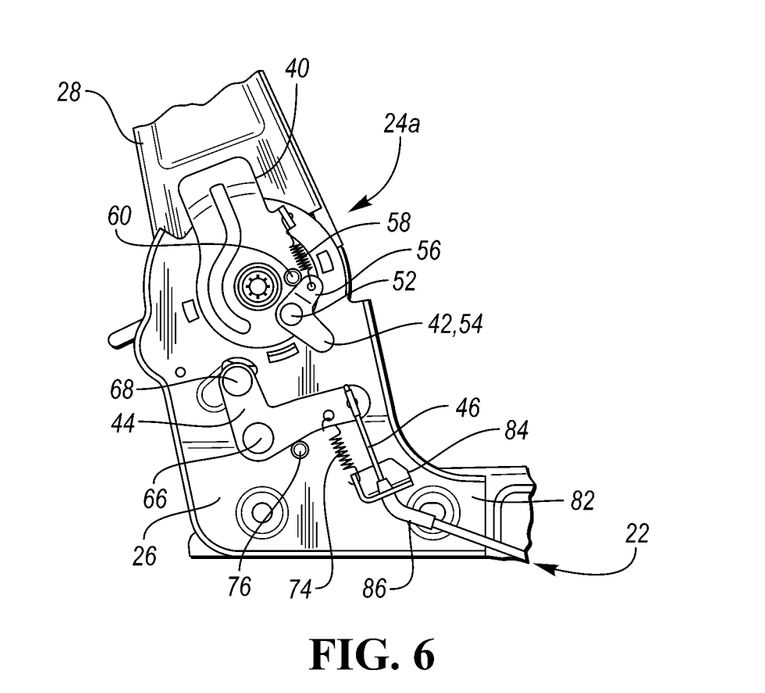
FIG. 6 is an enlarged fragmentary side view of the inboard side of the seat showing the fold and tumble mechanism.

Referring to FIGS. 4 and 6, the fold and tumble mechanism 22 includes a support bracket 40 (e.g., one-piece support bracket) fixedly connected (e.g., welded, glued and/or fastened) to the back side bracket 28 of the first recliner assembly 24a, an actuating member or cam 42 pivotally connected to the support bracket 40, and a rocker member or arm 44 pivotally connected to the recliner bracket 26 of the first recliner assembly 24a. In the illustrated embodiment, the support bracket 40 extends over the recliner bracket 26 such that the recliner bracket 26 is disposed between the recliner 30 and the support bracket 40.

The rocker arm 44 is also connected to a latch cable 46 (e.g., Bowden cable) that is connected to or otherwise associated with at least one of the floor latches 20a, 20b. In the embodiment shown in FIG. 4, the latch cable 46 includes a main portion that extends to a junction box 48, and first and second output cables 50a and 50b, respectively, that extend from the junction box 48 to the first and second floor latches 20a, 20b, respectively. As explained below, the actuating cam 42 is engageable with the rocker arm 44 when the seat back 16 is pivoted forwardly to cause the rocker arm 44 to pivot and pull on the latch cable 46, which releases the floor latches 20a and 20b so that the seat bottom 14 may pivot upwardly.

Referring to FIG. 6, the actuating cam 42 may be pivotally connected to the support bracket 40 in any suitable manner. For example, the actuating cam may be pivotally connected directly to the support bracket with a pivot pin or shaft 52. Furthermore, the actuating cam 42 may be a one-piece component having any suitable shape, such as an L-shape. In the illustrated embodiment, the actuating cam 42 includes a first portion or arm 54 that is engageable with the rocker arm 44, and a second portion or arm 56 that extends at an angle with respect to the first arm 54 and is connected to a first biasing member, such as a first coil spring 58, which is also connected to the support bracket 40. The first spring 58 is configured to bias or otherwise urge the actuating cam 42 toward a first stop 60, which is attached to the support bracket 40 and configured to inhibit or prevent pivotal movement of the actuating cam 42 (e.g., in a counterclockwise direction in the embodiment shown in FIG. 6) when the actuating cam 42 is engaged with the first stop 60. Referring to FIG. 4, the first stop 60 may include a pin 62 and a damping sleeve or cover 64, such as a plastic cover, positioned over the pin for reducing noise when the actuating cam 42 contacts the first stop.

Likewise, the rocker arm 44 may be pivotally connected to the recliner bracket 26 in any suitable manner, such as with a pivot pin or shaft 66. The rocker arm 44 may also be a one-piece component having an L-shaped configuration and includes an engagement member 68, such as a pin or pin assembly, that is engageable with the first arm 54 of the actuating cam 42 when the seat back 16 is pivoted forwardly. Furthermore, the engagement member 68 may include a fixed striker pin 70 and a movable member or cover, such as a metal sleeve or ring 72, disposed over the pin 70 and that is rotatable with respect to the pin 70 for providing a movable contact surface for the actuating cam 42. Such a configuration may enable smooth operation of the fold and tumble mechanism 22 when the actuating cam 42 contacts the engagement member 68.

The fold and tumble mechanism 22 may further include a second biasing member, such as a second coil spring 74, having a first end connected to the recliner bracket 26 and a second end connected to the rocker arm 44. The second spring 74 is configured to bias or otherwise urge the rocker arm 44 toward a second stop 76, which is connected to the recliner bracket 26 and configured to inhibit or prevent pivotal movement of the rocker arm 44 (e.g., in a clockwise direction in the embodiment shown in FIG. 6) when the rocker arm 44 is engaged with the second stop 76. In the embodiment shown in FIGS. 4 and 6, the second stop 76 includes a pin 78 attached to the recliner bracket 26 and a damping sleeve or cover 80, such as a plastic cover, disposed over the pin 78 for reducing noise when the rocker arm 44 contacts the second stop 76.

In the embodiment shown in FIG. 6, the recliner bracket 26 includes a main body 82 and a projecting portion 84 that projects outwardly from the main body 82. The projecting portion 84 receives the latch cable 46 and is connected to the first end of the second spring 74. Specifically, the projecting portion 84 receives an outer sleeve 86 of the latch cable 46.

Figure 7:
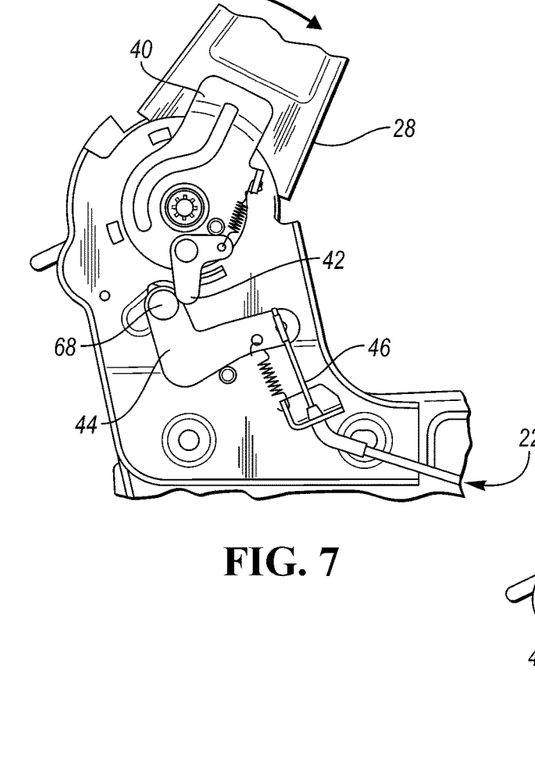
FIG. 7 is an enlarged fragmentary side view similar to FIG. 6 showing the seat back pivoted slightly forward with respect to the seat bottom so that an actuating member of the fold and tumble mechanism engages a rocker member of the fold and tumble mechanism.
Figure 8:
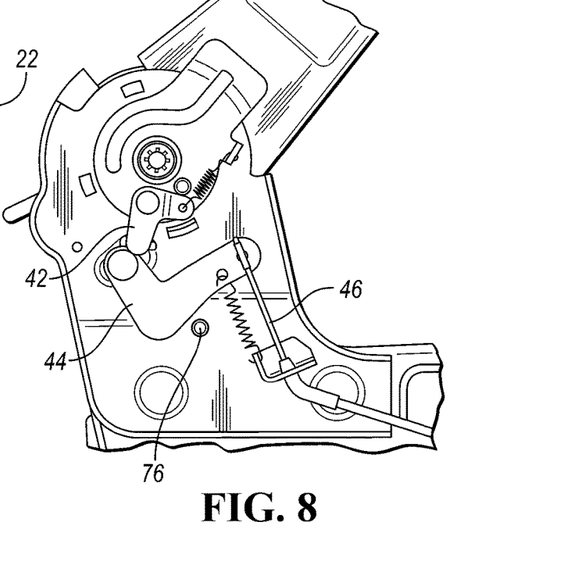
FIG. 8 is an enlarged fragmentary side view similar to FIG. 7 showing the rocker member pivoted rearwardly due to engagement with the actuating member.
Figure 9:
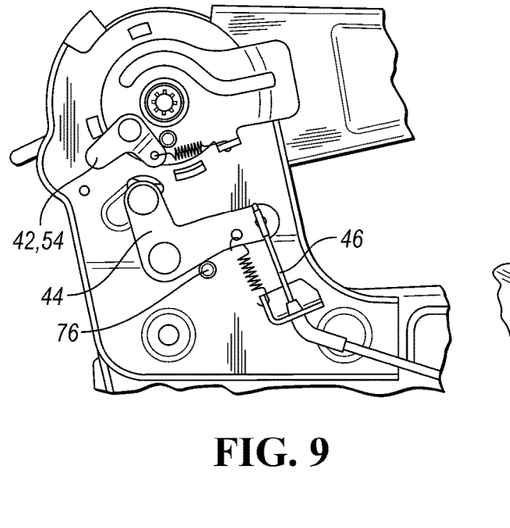
FIG. 9 is an enlarged fragmentary side view similar to FIG. 8 showing the seat back in a full folded position such that the actuating member is disengaged from the rocker member.

Referring to FIGS. 1-9, operation of the seat 10 will now be described in more detail. When a vehicle occupant or someone outside of the vehicle desires to execute a fold and tumble operation, the recliner lever 34 shown in FIGS. 1, 3 and 5 may be rotated rearwardly to a single actuated position to release both recliners 30 so that the seat back 16 may fold forwardly due to spring force of the spring 31 (shown in FIG. 4), which is connected between the seat back 16 and the seat bottom 14. As the seat back 16 pivots forwardly, the actuating cam 42 will contact the engagement member 68 (e.g., the ring 72 of the engagement member 68) of the rocker arm 44 of the fold and tumble mechanism 22, as shown in FIG. 7, and cause the rocker arm 44 to pivot rearwardly away from the second stop 76, as shown in FIG. 8. The rocker arm 44 in turn pulls on the latch cable 46, which releases the floor latches 20a and 20b from the vehicle floor 12 shown in FIG. 1 (e.g., movement of the latch cable 46 causes a latch member of each floor latch 20a, 20b to move to an open or released position). Referring to FIG. 9, continued forward rotation of the seat back 16 toward the seat bottom 14 allows the first arm 54 of the actuating cam 42 to move past the rocker arm 44 so that the rocker arm 44 may rotate forwardly to its design position against the second stop 76. Furthermore, after the floor latches 20a and 20b have been released, the seat bottom 14 will tumble forwardly with the seat back 16, due to biasing force of a biasing member, such as a spring 90 (shown schematically in FIG. 2), until the seat back 16 and seat bottom 14 achieve the folded and tumbled position shown in FIG. 2.

Figure 10:
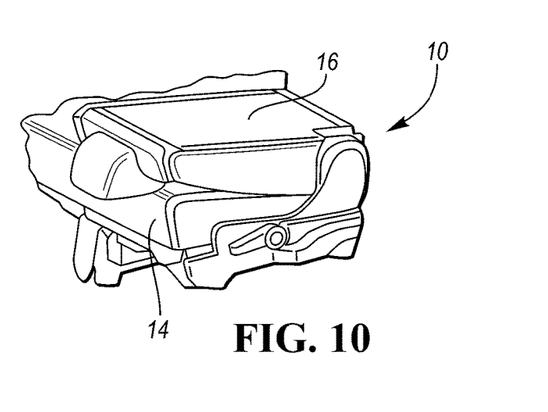
FIG. 10 is a perspective view of the seat showing the seat back folded forwardly against the seat bottom to form a load floor.

When it is desired to return the seat 10 to its use position, the seat back 16 and seat bottom 14 may be pivoted rearwardly until the floor latches 20a and 20b re-engage or lock onto the floor-mounted strikers (e.g., the latch member of each floor latch 20a, 20b moves to a locked position beneath, adjacent to, or engaged with a corresponding striker). At this point, the seat back 16 may be kept in its folded position to provide a load floor or support surface if desired, as shown in FIG. 10. Alternatively, the seat back 16 may be pivoted rearwardly to its design use position shown in FIG. 1.

Figure 11:
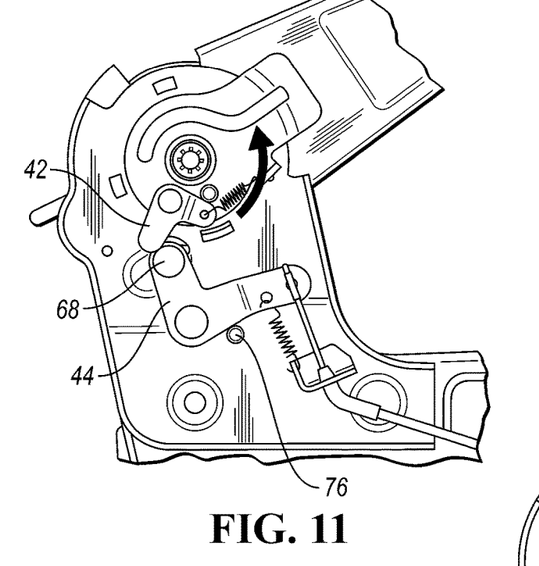
FIG. 11 is an enlarged fragmentary side view similar to FIG. 9 showing the seat back moved away from the seat bottom so that the actuating member is engaged with the rocker member.
Figure 12:
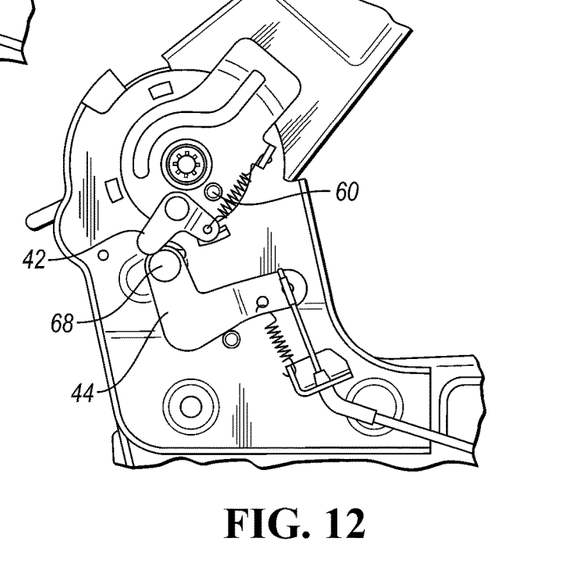
FIG. 12 is an enlarged fragmentary side view similar to FIG. 11 showing the seat back moved further rearwardly so that the actuating member is rotated forwardly due to engagement with the rocker member.
Figure 13:
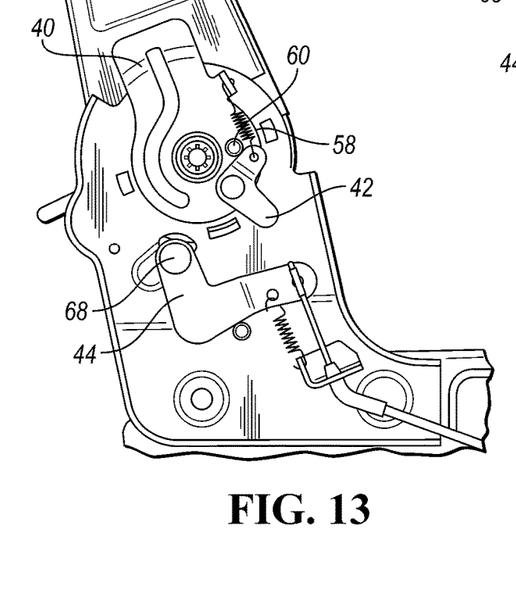
FIG. 13 is an enlarged fragmentary side view similar to FIG. 12 showing the seat back returned to its design use position, with the actuating member disengaged from the rocker member.

Referring to FIG. 11, as the seat back 16 is pivoted rearwardly toward the design use position, the actuating cam 42 will again contact the engagement member 68 (e.g., the ring 72 of the engagement member 68) of the rocker arm 44. Because the rocker arm 44 is prevented from rotating forwardly by the second stop 76, the actuating cam 42 will rotate forwardly (e.g., clockwise in FIG. 12) away from the first stop 60, as shown in FIG. 12. After the actuating cam 42 passes the engagement member 68 of the rocker arm 44, the actuating cam 42 will rotate rearwardly and return to its design position engaged with the first stop 60 due to spring force of the first spring 58, as shown in FIG. 13.

Figure 2:
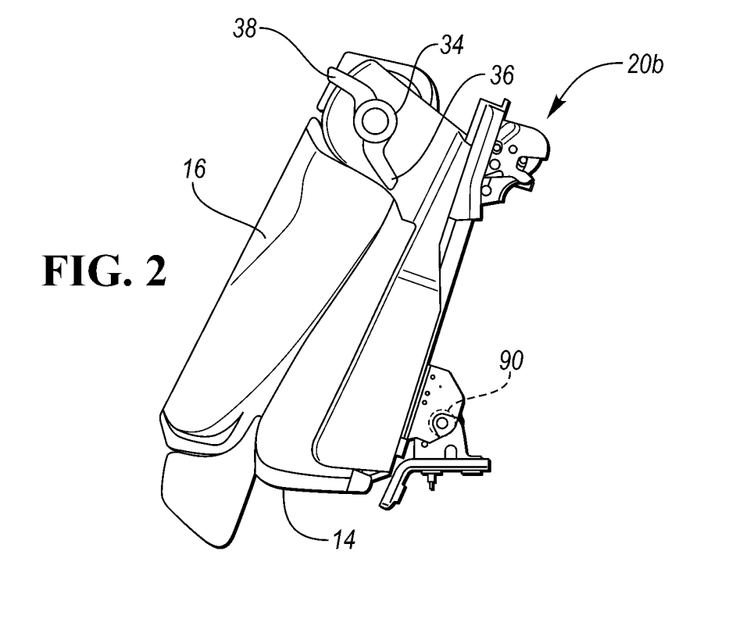
FIG. 2 shows the seat in a folded and tumbled position.

The above configuration of the seat 10 allows for efficient movement of the seat 10 from the use position shown in FIG. 1 to the folded and tumbled position shown in FIG. 2 with a single actuation of the recliner lever 34 (i.e., rotation of the recliner lever 34 to a single actuation point or position). Furthermore, the fold and tumble mechanism 22 provides a cost-effective solution for enabling such movement of the seat 10.

Figure 14:
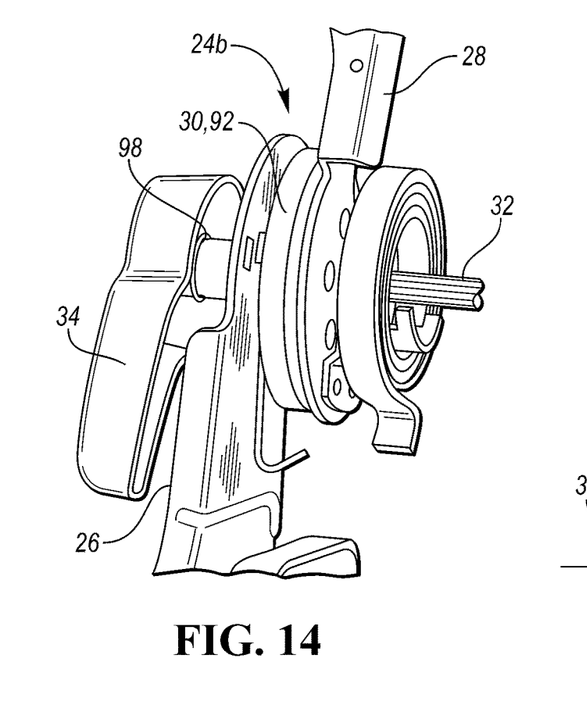
FIG. 14 is an enlarged fragmentary perspective view of the outboard side of the seat showing details of the attachment of the recliner lever to and outboard recliner assembly of the recliner arrangement.
Figure 15:
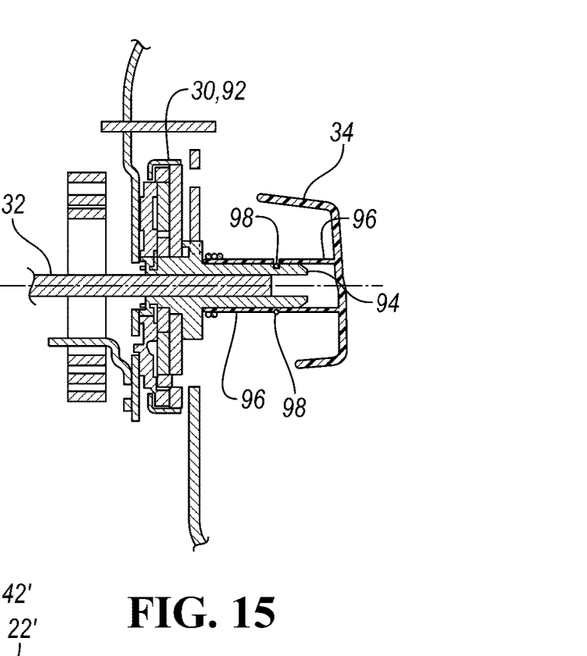
FIG. 15 is a cross-sectional view of the recliner lever and outboard recliner assembly shown in FIG. 14.

Referring to FIGS. 14 and 15, details of how the recliner lever 34 may be attached to the recliner 30 of the second recliner assembly 24b (e.g., outboard recliner assembly) are shown. In the illustrated embodiment, the recliner 30 includes a recliner hub 92 having a tubular portion 94, and the recliner lever 34 has a sleeve portion 96 that is configured to mate with the tubular portion 94 such that the recliner lever 34 is prevented from rotating with respect to the recliner hub 92. For example, the sleeve portion 96 and tubular portion 94 may each have a flat surface section, and the flat surface sections may engage each other to prevent relative rotation of the sleeve portion 96 and the tubular portion 94. As another example, one of the sleeve portion 96 and the tubular portion 94 may have a key feature that is received in a mating receptacle (e.g., slot) formed in the other of the sleeve portion 96 and the tubular portion 94. Furthermore, the recliner arrangement 18 may include a clip 98 (e.g., an Omega clip) received in a notch or groove formed in the recliner lever sleeve portion 96 as well as a notch or groove formed in the tubular portion 94 of the recliner hub 92 such that the clip 98 secures the recliner lever 34 to the recliner hub 92. Referring to FIG. 15, the recliner hub 92 may be mounted on the shaft 32 that extends between the first and second recliner assemblies 24a and 24b. With such a configuration, the recliner lever 34 may be used to actuate both recliner assemblies 24a and 24b, as mentioned above in detail.

It should be noted that components of the seat 10 may be made of any suitable material and in any suitable manner. For example, the support bracket 40, actuating cam 42 and rocker arm 44 may each be made of stamped metal, such as steel or aluminum.

Figure 16:
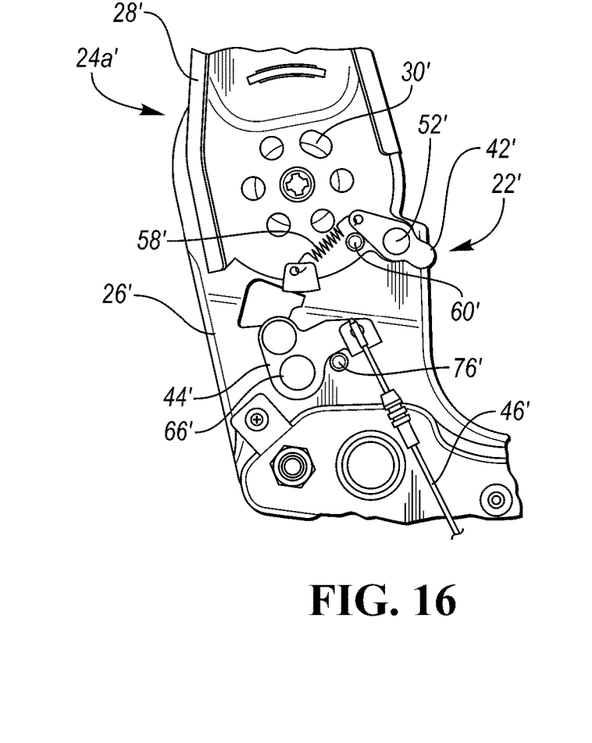
FIG. 16 is an enlarged fragmentary side view of a second embodiment of the fold and tumble mechanism according to the disclosure.

Referring to FIG. 16, a second embodiment of an inboard portion of the vehicle seat is shown, and the second embodiment includes an alternative fold and tumble mechanism 22' and an alternative first recliner assembly 24a'. The fold and tumble mechanism 22' and the first recliner assembly 24a' are similar to the fold and tumble mechanism 22 and the first recliner assembly 24a, respectively. Furthermore, similar components are identified with similar reference numbers, except the reference numbers for the fold and tumble mechanism 22' and the first recliner assembly 24a' each include a prime mark. In addition, the fold and tumble mechanism 22' and the first recliner assembly 24a' function in a similar manner as the above described components, such that further detailed description of the operation of the fold and tumble mechanism 22' and the first recliner assembly 24a' is not necessary.

In the embodiment shown in FIG. 16, actuating member or cam 42' of the fold and tumble mechanism 22' is pivotally attached directly to upper support member or back side bracket 28'. In addition, first biasing member or spring 58', which urges the actuating cam 42' toward first stop 60', has a first end connected to the back side bracket 28' and a second end connected to the actuating cam 42'. Likewise, first stop 60' is provided on the back side bracket 28'. With the above configuration, the support bracket 40 of the fold and tumble mechanism 22 has been eliminated. Furthermore, back side bracket 28' of the first recliner assembly 24a' is positioned outwardly of recliner bracket 26' (e.g., further away from a center of the seat), and recliner 30' is positioned between the recliner bracket 26' and the back side bracket 28'.

While the components may each have any suitable configuration, in the illustrated embodiment, the actuating cam 42' is formed as a one-piece component having an elongated, generally linear shape. Likewise, the rocker member or arm 44' is formed as a one-piece component having a generally T-shaped configuration.

Although not shown, the fold and tumble mechanism 22' may also include a second biasing member for urging the rocker arm 44' toward second stop 76'. For example, the fold and tumble mechanism 22' may include a second spring that is similar to the second spring 74 of the fold and tumble mechanism 22, or a second spring that is positioned around second pivot shaft 66'.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A vehicle seat comprising:
    a seat bottom;
    a seat back that is pivotable with respect to the seat bottom;
    a recliner arrangement including a recliner bracket connected to the seat bottom, a back side bracket connected to the seat back, and a recliner connected to the recliner bracket and the back side bracket and configured to allow the seat back to pivot with respect to the seat bottom;
    a floor latch associated with the seat bottom; and
    a fold and tumble mechanism including an actuating member pivotally connected directly to the back side bracket, and a rocker member pivotally connected to the recliner bracket and connected to a latch cable associated with the floor latch, wherein the actuating member is engageable with the rocker member when the seat back is pivoted forwardly to cause the rocker member to pivot and pull on the latch cable, which releases the floor latch so that the seat bottom may pivot upwardly.

2. The vehicle seat of claim 1 wherein the back side bracket is positioned outwardly of the recliner bracket, and the recliner is disposed between the recliner bracket and the back side bracket.

3. The vehicle seat of claim 1 wherein the recliner is disposed on a first side of the vehicle seat, and wherein the recliner arrangement further includes an additional recliner disposed on a second side of the vehicle seat, and a recliner lever connected to the additional recliner for actuating both recliners.

4. The vehicle seat of claim 3 wherein the recliner lever includes a lower handle, which may be grasped by an occupant of the vehicle seat for reclining the seat back or by someone desiring to execute a fold and tumble operation in order to gain access behind the vehicle seat, and an upper handle that may be grasped by a vehicle occupant located behind the vehicle seat in order to perform a fold and tumble operation.

5. The vehicle seat of claim 1 wherein the fold and tumble mechanism further includes a stop on the back side bracket for inhibiting pivotal movement of the actuating member, and a coil spring having a first end connected to the back side bracket and a second end connected to the actuating member, wherein the coil spring is configured to urge the actuating member toward the stop.

6. The vehicle seat of claim 5 wherein the stop includes a pin connected to the back side bracket and a damping cover disposed over the pin for reducing noise when the actuating member contacts the stop.

7. The vehicle seat of claim 1 wherein the fold and tumble mechanism further includes a stop on the recliner bracket for inhibiting pivotal movement of the rocker member, and a coil spring having a first end connected to the recliner bracket and a second end connected to the rocker member, wherein the coil spring is configured to urge the rocker member toward the stop.

8. The vehicle seat of claim 7 wherein the stop includes a pin connected to the recliner bracket and a damping cover disposed over the pin for reducing noise when the rocker member contacts the stop.

9. The vehicle seat of claim 1 wherein the actuating member has an elongated, generally linear shape.

10. The vehicle seat of claim 1 wherein the rocker member has a T-shaped configuration.

11. The vehicle seat of claim 1 wherein the actuating member is pivotally connected to the back side bracket at a location below a rotational axis of the recliner when the seatback is in an upright use position.

12. The vehicle seat of claim 11 wherein the fold and tumble mechanism further includes a stop on the back side bracket for inhibiting pivotal movement of the actuating member, and a spring having a first end connected to the back side bracket and a second end connected to the actuating member, wherein the spring is configured to urge the actuating member toward the stop.

13. The vehicle seat of claim 12 wherein the stop is located below the rotational axis of the recliner when the seat back is in an upright use position.

14. The vehicle seat of claim 12 wherein the first and second ends of the spring are located below the rotational axis of the recliner when the seat back is in an upright use position.

15. The vehicle seat of claim 12 wherein the stop and the spring are located below the rotational axis of the recliner when the seat back is in an upright use position.

16. The vehicle seat of claim 1 wherein the actuating member is pivotally connected directly to the back side bracket with a pivot shaft at a location below a rotational axis of the recliner when the seatback is in an upright use position.

17. The vehicle seat of claim 16 wherein the fold and tumble mechanism further includes a stop fixedly attached to the back side bracket and configured to inhibit pivotal movement of the actuating member, and a spring having a first end connected directly to the back side bracket and a second end connected to the actuating member, wherein the spring is configured to urge the actuating member toward the stop.

18. The vehicle seat of claim 17 wherein the stop is located below the rotational axis of the recliner when the seat back is in the upright use position.

19. The vehicle seat of claim 18 wherein the actuating member has an elongated, generally linear shape, such that first and second ends of the actuating member are aligned along an axis that extends through a pivot point of the actuating member.

20. The vehicle seat of claim 1 wherein the actuating member is a one-piece member that is pivotally connected directly to the back side bracket with a pivot shaft at a location below a rotational axis of the recliner when the seatback is in an upright use position.

\* \* \* \* \*